United States Patent [19]

Palmer

[11] Patent Number: 4,676,527
[45] Date of Patent: Jun. 30, 1987

[54] COACHES FOLDER

[76] Inventor: Ronald Palmer, 7815 Turbo, Long beach, Calif. 90808

[21] Appl. No.: 829,443

[22] Filed: Feb. 13, 1986

Related U.S. Application Data

[63] Continuation-in-part of Ser. No. 706,010, Feb. 27, 1985, abandoned, which is a continuation of Ser. No. 467,931, Feb. 18, 1983, abandoned.

[51] Int. Cl.$^4$ .................. B42D 3/00; A44B 18/00; G09F 1/10; A63B 69/00
[52] U.S. Cl. ........................ 281/31; 281/30; 24/306; 40/159; 434/248
[58] Field of Search ............ 281/30, 31, 39, 45; 434/248, 251; 40/158 A, 159; 206/224, 499; 150/103, 105; 220/23.6; 24/306

[56] References Cited

U.S. PATENT DOCUMENTS

| | | | |
|---|---|---|---|
| 2,030,135 | 2/1936 | Carpenter | 40/158 A |
| 3,403,429 | 10/1968 | Smith | 24/306 |
| 3,685,170 | 8/1972 | Fairleigh | 434/238 |
| 3,766,676 | 10/1973 | Slemmons | 40/158 A |
| 4,470,620 | 9/1984 | Gerch | 281/30 |

Primary Examiner—Paul A. Bell
Assistant Examiner—Paul M. Heyrana, Sr.
Attorney, Agent, or Firm—Charles H. Thomas

[57] ABSTRACT

A folder is especially designed for use by an athletic coach or instructor. The folder includes a pair of stiff, rectangular supports or covers joined in the folding fashion by a linear hinge. On both the interior and exterior surface of at least one of the covers there are a plurality of releasable fastening elements, such as velcro pads. A rectangular chalkboard is provided having a top surface permanently marked with a diagram of the competition area and demarkation lines an athletic sport. The undersurface of the chalkboard is equipped with second, mating releasable fastener elements, that are releasably engageable with the first fastening elements. A magnetic board is likewise provided having a top surface permanently marked with a diagram of the competition area and demarkation lines of an athletic sport with the undersurface of the magnetic board equipped with second releasable fastening elements arranged in the same mirror image pattern as that on the surfaces of the cover.

12 Claims, 6 Drawing Figures

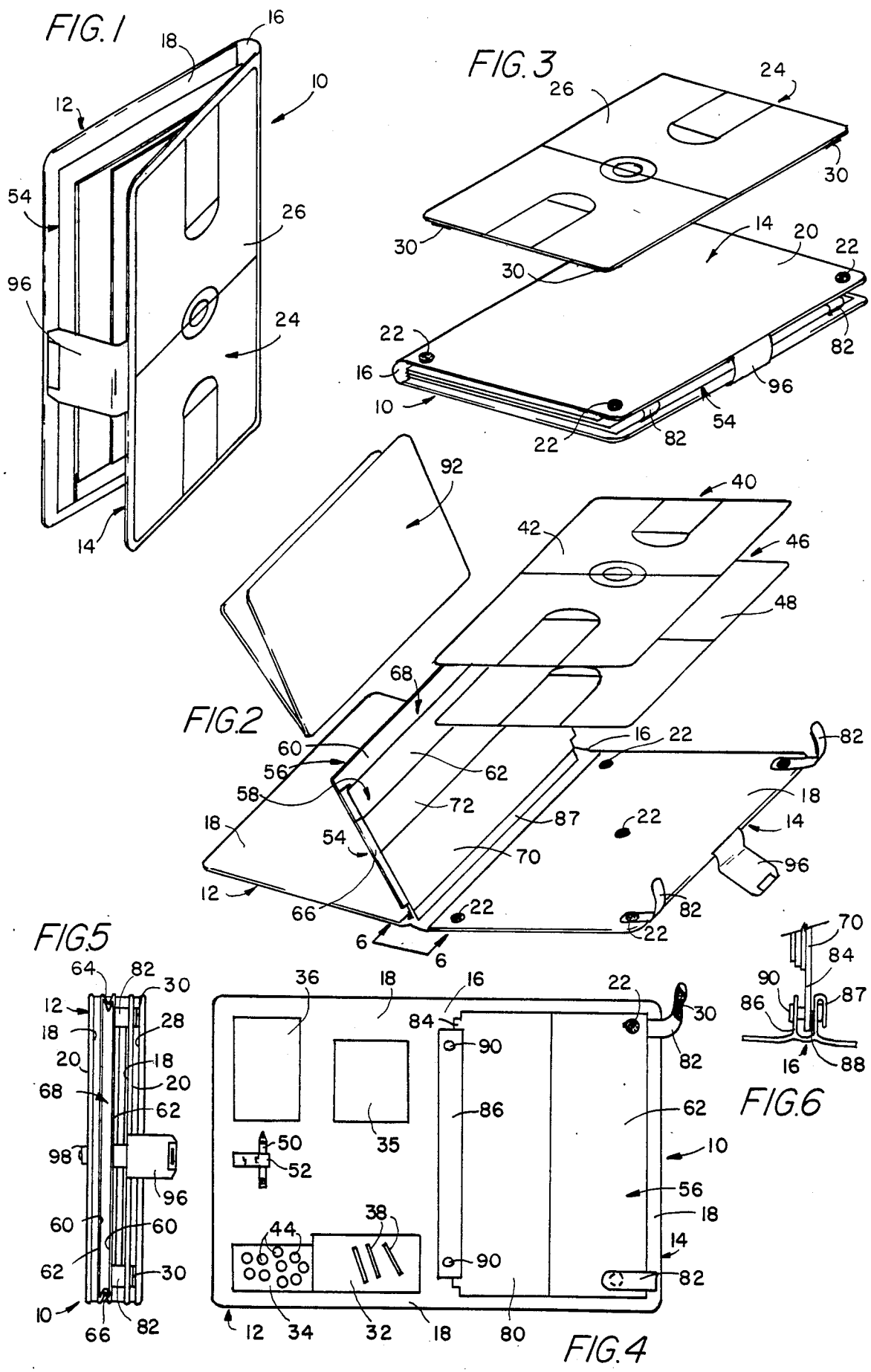

COACHES FOLDER

BACKGROUND OF THE INVENTION

The present application is a continuation-in-part of U.S. application Ser. No. 706,010, filed Feb. 27, 1985 now abandoned, which is a continuation of U.S. application Ser. No. 467,931, filed on Feb. 18, 1983, now abandoned.

FIELD OF THE INVENTION

The present invention relates to a portable carrying and storage implement and teaching aid which is especially adapted for use by athletic instructors and coaches.

DESCRIPTION OF THE PRIOR ART

Athletic coaches and instructors of elementary school, high school and college athletic sports, as well as other, non-academic athletic sports have, for many years, been burdened with a particular problem involving their instructional materials and teaching aids. Like instructors of classroom subjects, athletic instructors and coaches must deal with class schedules, class and team rosters, notebooks, and rule books which often serve as their texts. Moreover, chalkboards and other visual aids are extremely useful for purposes of instructing students and players in athletic sports, much the same as in the instruction of classroom subjects. However, unlike their counterparts who teach subjects in a classroom, athletic instructors and coaches are not provided with chalkboards fixed on walls and with desks or podiums at the location of instruction in which classroom papers and other materials can be conveniently held and stored. Indeed, fixed chalkboards and desks would be of little value to an athletic instructor or coach because instruction and observation in athletic events is not conducted at a fixed locaion. Rather, the coach or instructor must have the ability to move rapidly and freely from one location to another to observe, instruct and critique the performance of the athletic participants an team members.

Attempts have been made to provide coaches and athletic instructors wiht the types of visual aids which classroom instructors enjoy. Portable chalkboards mounted upon easels or other moveable supports have been utilized. However, it is always necessary to return to the location of the chalkboard, or to expend the time necessary in moving the easel to the current location of the students or team members before the visual aid of the chalkboard can be used in athletic instruction. Furthermore, portable chalkboards of this type are awkward to move and are frequently knocked down or upended by the rapid movement of the players, observers, and others in the immediate vicinity. Portable chalkboards are often knocked down or damaged by balls and players traveling out of bounds. The chalk and erasers which normally rest in trays on the chalkboard easels are scattered and sometimes destroyed during such occurrences.

While coaches and athletic instructors frequently employ folders for carrying schedules, rosters, diagrams, notebooks and rule books which are necessary for the competent conduct of athletic instruction, the only folders heretofore available have been of the same type as those used by instructors and students in connection with subjects conducted in classrooms. Conventional folders of this type do not adequately accommodate the bulkier items associated with athletic instruction, such as chalk, magnetic boards representing sports fields and arenas, the magnetic pieces for representing team players on magnetic boards, erasers, and other articles which must be instantly accessible to athletic instructors and coaches.

SUMMARY OF THE INVENTION

The present invention is a device especially adapted for use by athletic coaches and instructors. The invention includes a folder which has a pair of flat, stiff supports of generally rectangular configuration, separated by a linear hinge. In addition, a small chalkboard of approximately the same size as a support is mounted upon one of the supports. The chalkboard is permanently inscribed with a diagram of the competition area and demarkation lines of an athletic sport which is the subject of instruction or coaching. Furthermore, at least one flat, magnetic board is also provided. The magnetic board is permanently inscribed with a diagram of the competition area and demarkation lines of either the same sport to which the chalkboard pertains, or of a different sport.

Both the chalkboard and the magnetic board may be releasably secured to both the inner and outer surfaces of at least one of the supports or covers. Attachment is effectuated through use of first and second releasable fastening elements. Preferably, the releasable fastening elements are formed of flat, mating velcro pads. The pads of one of the first and second releasable fastening elements each bears a multiplicity of minute, flexible hooks, formed, for example, of nylon. The other type of releasable fastening pads has a multiplicity of minute loops, also preferably formed of nylon. When the pads are pressed lightly together, hooks in significant numbers in one of the mating pads engage the loops of the pile in the other mating pad. Pads of one type are secured, as by adhesive, to at least one of the supports or covers in the same pattern on both the inner and outer surfaces. A plurality of pads of the other type are secured, as by adhesive, to the undersurface of both the chalkboard and the magnetic board in patterns thereon which are mirror images of the pattern of fastening elements on the inner and outer surfaces of the support. Thus, either the chalkboard or magnetic board can be secured to both the inner and outer surfaces of the support by the releasable interconnection of the mating velcro fastening elements. Whichever board is not secured to the outer surface of the support may be secured to the inner surface of the support.

At least one pocket is provided within the device, preferably on the interior surface of one of the supports or covers. The pocket is adapted to hold magnetic pieces and chalk.

In a preferred embodiment of the invention, yet an additional type of flat board is provided for use in the instruction of athletic sports. For example, the coaching aid of the invention may include a grease pencil marker board. The top surface of the grease pencil marker board is typically coated or covered with a slick plastic which will receive grease pencil markings. The surface is such that the grease pencil markings can be easily erased. The top surface of the grease pencil marker board, like the chalkboard and magnetic board, is permanently marked with a diagram of the competition area and demarkation lines of an athletic sport. The undersurface of the grease pencil marker board, like the undersurfaces of the chalkboard and the magnetic board, is equipped with a plurality of the second releasable fastening elements that are releasably engaged with the first fastening elements on the support surfaces. These second fastening elements are also arranged in a pattern on the undersurface of the grease pencil marker board which is the same mirror image of the pattern of the first releasable fastening elements on the surfaces of the support. Provision is made for the storage of grease pencils, as well as the chalk and magnetic pieces, between the covers.

Preferably, the athletic coaching aid also includes an insert which is releasably securable between the two covers at the hinge. The insert includes a pair of flat, rectangular panels or partitions which are connected along opposite edges perpendicular to the hinge by accoridan webs so as to define a large, main pocket between the panels. The mouth of this pocket opens outwardly opposite from the hinge and extends nearly the entire length of the hinge. The main pocket is large enough to receive a folding file. Such folding files are particularly useful for holding note pads, diagrams, and other papers and materials frequently used by athletic coaches. When desired, the folding file may be easily removed from between the covers of the folder and carried to meetings and conferences where athletic instructors are unlikely to require the small chalkboards, magnetic boards and grease pencil boards of the invention. The athletic instructor is thus freed from the burden of carrying the entire folder. Nevertheless, the folding file can be easily reinserted and connected in the folder and utilized as an integral part thereof during the course of athletic instruction.

In addition to the main pocket defined between the facing surfaces of the panels or partitions and the connecting webs, smaller pockets are preferably defined on at least one of the opposite surfaces of one or both of the panels. Terraced pockets can be defined by successive strips of material secured with the narrowest strip adjacent to the hinge and with wider strips sandwiched between the narrowest strip and the outer surfaces of the panels.

The invention may be described with greater clarity and particularity by reference to the accompanying drawings.

DESCRIPTION OF THE DRAWINGS

FIG. 1 is a perspective view showing a folder of the invention standing on end and partially opened.

FIG. 2 is another perspective, exploded view, showing the manner in which the portions of the folder of the invention fit together.

FIG. 3 is an exploded perspective view showing he manner of releasable connection of a chalkboard to the outer surface of a cover.

FIG. 4 is a top plan view showing the folder of the invention fully opened.

FIG. 5 is an elevational edge view of the folder of FIG. 1 fully closed.

FIG. 6 is an end detail taken at the lines 6—6 of FIG. 2.

DESCRIPTION OF THE EMBODIMENT

FIG. 1 illustrates a folder 10 suitable for use by athletic coaches. The folder 10 is a combination coaches portable carrying instrument and teaching aid. The folder 10 is comprised of stiff, rectangular covers or supports, 12 and 14 joined along adjacent edges at a hinge 16, visible in FIGS. 2 and 4. Each of the covers 12 and 14 has opposite interior and exterior surfaces 18 and 20, respectively. A plurality of first, releasable fastening elements in the form of female velcro pads 22 are arranged in a first pattern on both the interior surface 18 and the exterior surface 20 of the cover 14, as illustrated in FIGS. 2, 3 and 5.

A flat chalkboard 24 is permanently marked on one flat surface 26 wih a diagram of the playing area and demarkation lines of a selected athletic sport. In the embodiment depicted, the lines of a basketball court are permanently marked on the top surface 26 of the chalkboard 24. The chalkboard 24 has an opposite flat under surface 28, visible in FIG. 5, having second, releasable fastening elements in the form of male velcro pads 30. The male velcro pads 30 are adapted for releasable engagement with the first fastening elements, the female velcro pads 22. The male velcro pads 30 are arranged in a second pattern that is a mirror image of the first pattern in which the female velcro pads are positioned. In the embodiment depicted, both patterns are identical patterns of four velcro pads at each corner of a surface, with another velcro pad at the intersection of the diagonals therebetween. Since the patterns of first and second releasable velcro fastening elements are arranged in mirror image orientation on the surfaces 18 and 20 of the cover 14 and on the undersurface 28 of the chalkboard 24, the mating pads come into contact with each other when the chalkboard 24 is placed upon either the surface 18 or the surface 20 of the cover 14. The chalkboard 24 may thereby be releasably secured to either the surface 18 or the surface 20 of the folder cover 14.

As illustrated in FIG. 4, pockets 32, 34, 35, and 36 are constructed on the interior surface 18 of the opposite cover 12. The pockets 32, 34, 35 and 36 are formed by rectangles of clear plastic, such as mylar, each secured along three edges and open at the top. As illustrated cylindrical pieces of chalk 38 can be carried in the pocket 32.

The folder 10 also includes a flat, magnetic board 40 that is permanently marked on one top flat surface 42 with the diagram and playing area of a selected athletic sport. The magnetic board 40 has on its opposite, flat surface, a plurality of the second releasable male velcro fastening pads 30 which are adapted for releasable engagement with the female velcro pads 22. The male velcro pads 30 on the undersurface of the magnetic board 40 are arranged in the same, second mirror image pattern as on the flat, undersurface 28 of the chalkboard 24. The magnetic board 40 is thereby also releasably securable to both the interior surface 18 and the exterior surface 20 of the folder cover 14. Disc shaped magnets 44, useful for illustrating players in connection with the magnetic board 40, are normally carrried in the pocket 34. The magnetic board 40 is magnetic in the sense that it is capable of being magnetised or attracted by a magnet. Preferably, the magnetic board 40 is constructed of a flat sheet of steel to which the magnetized discs 44 are attracted.

Each of the covers 12 and 14 is preferably formed of a stiff, flat, core material, preferably covered on the outer, exterior surfaces 20 with some scuff resistant covering, such as vinyl. The interior surfaces 18 are preferably covered with stiff paper treated so as to be moisture repellant. Stiffness is provided to the covers 12 and 14 by the core, which may be heavy cardboard, or fiberboard, sandwiched between the vinyl and paper coverings on the outer and inner surfaces 20 and 18, respectively. The hinge 16 is formed by a section of the vinyl covering that spans the gap between the core interiors of the covers 12 and 14. The covers 12 and 14 can thus be opened and closed along the hinge 18, as depicted in the drawing figures.

The first and second releasable fastening elements 22 and 30 respectively, are flat mating velcro pads arranged in sets. In each set the pad 30 bears a multiplicity of minute, flexible hooks. The other pad 22 in each set bears a pile having a multiplicity of minute loops engageable by the hooks. When the undersurface of either the magnetic board 40 or the chalkboard 24 is moved into juxtaposition with either the inner surface 18 or the outer surface 20 of the cover 14, the board will be firmly, but releasably secured thereto. Once secured, a board will not fall off of the surface to which it is releasably secured, even if the folder 10 is tilted or jostled about.

The folder 10 also includes a grease pencil marker board 46, visible in FIG. 2. The grease pencil marker board 46 has a slick, top surface 48 permanently marked with a diagram of the competition area and demarkation lines of an athletic sport. The surface 48 is a flat writing surface adapted to receive erasable markings from a grease pencil. The surfaces 26, 42 and 48 of the chalkboard 24, magnetic board 40 and grease pencil marker board 46 may all be marked wtih lines associated with the same athletic sport, or with lines associated with different atletic sports, depending upon the specialization of the athletic coach using the folder 10. Also, the folder 10 may include several different chalkboards 24, magnetic boards 40, and grease pencil marker boards 46, each corresponding to a separate sport, if the coach teaches instruction in several sports.

Like the chalkboard 24 and magnetic board 40, the grease pencil marker board 48 has an undersurface equipped with the second releaseable male velcro pads 30 that are releasably engageable with the first female velcro fastening pads 22. The pads 30 on the undersurface of the grease pencil parker 46 are arranged in a pattern on the underside thereon which is the mirror image of the pattern on the surfaces 18 and 20 of the cover 14. In the embodiment depicted, grease pencils such as the grease pencil 50 may be carried between the covers 12 and 14, as depicted in FIG. 4. A narrow plastic strap 52 is secured at its ends and at intermediate locations to the inner surface 18 of the cover 12 to define loops which snugly receive grease pencils therewithin and which hold the grease pencils in position against the inner surface 18 of the cover 12.

The folder 10 also includes a rectangular insert 54 which is removably fastened between the covers 12 and 14 at the linear hinge 16. The insert 54 includes a pair of flat, rectangular panels 56 and 58, each having facing and opposite surfaces 60 and 62. The flat, rectangular panels 56 and 58 are connected along opposite edges which are perpendicular to the hinge 16 by accordian webs 64 and 66. As best depicted in FIGS. 2 and 5, a pocket is defined between the facing surfaces 60 of the panels or partitions 56 and 58 and the accordian webs 64 and 66. The mouth of the pocket indicated generally at 68 in FIG. 2, opens outwardly between the corresponding edges of the panels or partitions 56 and 58 that are parallel and opposite to the hinge 16.

As illustrated in FIG. 2, two additional pockets are defined on the outwardly facing surface 62 of the panel 58. These pockets are defined by a pair of parallel stiffened vinyl strips 70 and 72, which are secured at the edges of the panel 58 to which the webs 62 and 64 are joined. The strips 70 and 72 may alternatively be formed of rigid paper, plastic covered cardboard, or any other suitable material. The strip 70 is narrower than the strip 72, and both of the strips 70 and 72 emanate from the area of the hinge 16. Since the wider strip 72 is sandwiched between the narrowest strip 70 and the partition 58, two additional outwardly opening, terraced pockets are defined on the insert 54. That is, one additional pocket is defined between the strips 70 and 72, while another additional pocket is defined between the strip 72 and the outwardly facing surface 62 of the partition 58.

As illustrated in FIG. 4, a further additional pocket is defined between the outwardly facing surface 60 of the partition 56 and another stiff strip 80 located thereagainst. Also, a pair of female velcro fastener pads 22 are located on the outermost corners of the partition 56 on the outermost surface 62 thereof. The female velcro pads 22 on the surface 62 are positioned to receive mating velcro pads 30 on the underside of strips of material which serve to form latching tabs 82. One edge of each latching tab 82 is secured to the inner surface 18 of the folder cover 14, and the free end of each latching tab 82 bears a male velcro pad 30. As illustrated in FIG. 4, the insert 54 can be folded over toward the cover 14, and held in juxtaposition thereagainst by means of the latching tabs 82.

As best illustrated in FIG. 6, the edge of the insert 54 adjacent to the hinge 16 terminates in a linear mounting strip 84 which projects toward the hinge 16 from the narrow vinyl strip 70. The mounting strip 84 has a pair of apertures therethrough, one at either end of the folder 10. The hinge 16 is defined with flaps 86 and 87 projecting toward the insert 54 on both sides of the mounting strip 84. Screws 88 have shanks that project through apertures in the flap 87, while the shanks of sockets 90 project through apertures in the flap 86. The apertures in the flaps 86 and 87, and the apertures in the mounting strip 84 are longitudinally aligned. The shanks of the screws 88 are externally threaded, while the shanks of the sockets 90 are internally threaded. The sockets 90 and screws 88 can be threadibly engaged, as illustrated in FIGS. 6, to releasably secure the insert 54 between the covers 12 and 14.

As illustrated in FIG. 2, the folder 10 also includes a bi-folding, cardboard folding file 92, useful for holding diagrams and papers. The folding file 92 can be inserted into the mouth 68 of the main pocket of the insert 54 for conveniently storing and carrying the paperwork associated with an athletic sport. Alternatively, when a coach attends a conference or meeting at which the boards 24, 40 and 46 are not required, the folding file 92 can be removed from the insert 54 so that the coach is not burdened with the additional bulk and weight of the remaining portion of the folder 10.

A releasable snap-fastening clasp on a closure strap 96 is provided to secure the folder 10 completely shut. The closure strap 96 is secured at one end at the outer edge of the folder cover 14, and the clasp engages with a catch 98 located on the outer surface 20 of the folder cover 12.

The covers 12 and 14, and the insert 54 can be color coordinated in various combinations. for example, the colors of these and other portions of the folder 10 may be the colors of a particular school or athletic team.

To utilize the folder 10, an instructor or coach carries any necessary class rosters, notes, diagrams, rule books and other teaching materials in the folder 10 between the covers 12 and 14, preferably within one or more of the pockets defined therewithin in the insert 54. The folder 10 can be conveniently carried under one arm. When the coach or instructor desires to illustrate a point or demonstrate a play or other strategic athletic maneuver, he or she can do so by removing a stick of chalk 38 from the pocket 32 and writing on the chalkboard 24. Because the chalkboard 24 can be releasably attached to either the inner surface 18 or the outer surface 20 of the cover 14, the folder 10, with the chalkboard 24 thereon, can be oriented vertically and raised above the heads of the nearest players or observers so that those more distant from the instructor are able to see it. In the same manner, the magnetic disks 44 may be withdrawn from the pocket 34 and used in conjunction with the magnetic board 40. In like manner, the grease pencil 50 can be used to illustrate plays and player positions on the grease pencil marker board 46. The boards 24, 40 and 46 can be used selectively, either alternatively or in conjunction with each other. Furthermore, a folder 10 can be passed among the students or players for closer observation, since the boards 24, 40 and 46 and the magnetic pieces 44 are maintained in position, respectively, by releasable velcro fastening pads 22 and 30 and by the force of magnetism.

Undoubtedly, numerous variations and modifications of the invention will become readily apparent to those familiar with the instruction and coaching of atletic sports. Accordingly, the scope of the invention should not be construed as limited to the specific embodiment depicted in the drawings, but rather is defined in the claims appended hereto.

I claim:

1. An athletic coaching aid comprising a folder including first and second flat, stiff rectangular supports, each having inner and outer surfaces, and joined along a linear hinge, a plurality of first releasable fastening elements spaced apart across both said inner and outer surfaces of at least said first support in the same pattern thereon, a chalkboard having a top surface permanently marked with a diagram of the competition area and demarkation lines of an athletic sport, and an undersurface equipped with second releasable fastening elements that are releasably engageable with said first fastening elements, and which are arranged in a pattern in the mirror image of said pattern of said first fastening elements on said surfaces of said first support, a magnetic board having a top surface permanently marked with a diagram of the competition area and demarkation lines of an athletic sport and having an undersurface equipped with second releasable fastening elements arranged in said same mirror image pattern as on said undersurface of said chalkboard, pocket means on at least one of said supports, and chalk and magnetic pieces carried in said pocket means.

2. An athletic coaching aid according to claim 1 further comprising a grease pencil marker board having a slick, top surface permanently marked with a diagram of the competition area and demarkation lines of an athletic sport and adapted to receive removable markings from a grease pencil and having an undersurface equipped with second releaseable fastening elements that are releaseably engageable with said first fastening elements, and said second fastening elements are arranged in a pattern which is the mirror image of said pattern on said surfaces of said first support, and further comprising grease pencils carried between said supports.

3. An athletic coaching aid according to claim 1 further comprising a rectangular insert removeably fastened between said first and second supports at said linear hinge, and said insert defines at least one pocket therewithin.

4. An athletic coaching aid according to claim 3 wherein said insert is comprised of at least a pair of rectangular partitions joined together at said hinge and along corresponding edges that are oriented perpendicular to said hinge, and having facing surfaces and opposite surfaces, thereby defining a pocket between said facing surfaces which opens outwardly between said corresponding edges of said partitions parallel to and opposite to said hinge.

5. An athletic coaching aid according to claim 4 further comprising at least one additional pocket defined on at least one of said outwardly facing surfaces of at least one of said partitions.

6. An athletic coaching aid according to claim 3 further comprising latching tabs having fixed ends secured to at least one of said supports and free ends bearing second releasable fastening elements, first releaseable fastening elements on said opposite surface of at least one of said partitions positioned for releaseable engagement said second releaseable fastening elements on said latching tabs.

7. An athletic coaching aid according to claim 1 wherein said first and second releaseable elements are comprised of sets of flat, mating pads, and in each set one of said mating pads bears a multiplicity of minute, flexible hooks and the other of said pads bears a pile having a multiplicity of minute loops engageable by said hooks.

8. A folder suitable for use by athletic coaches comprising a pair of stiff, rectangular covers joined at a hinge along adjacent edges and having opposite interior and exterior surfaces, a plurality of first releasable fastening elements arranged in a first pattern on both said interior and exterior surface of at least one of said covers, a flat chalkboard permanently marked on one flat surface with a diagram of the playing area and demarkation lines of a selected athletic sport and having on an opposite flat surface, second releasable fastening elements, adapted for releasable engagement with said first fastening elements, arranged on said opposite flat surace in a second pattern that is a mirror image of said first pattern, whereby said chalkboard is releasably securable to both said interior and exterior surfaces of at least said one of said covers, pocket means located between said interior surfaces of said covers, a flat magnetic board permanently marked on one flat surface with the diagram of the playing area and demarkation lines of a selected athletic sport and having, on an opposite flat surface, second releasable fastening elements adapted for releasable engagement with said first fastening elements, arranged in said same second pattern as on said opposite flat surface of said chalkboard, whereby said magnetic board is also releaseably securable to both interior and exterior surfaces of at least said one of said covers, and chalk and magnetic pieces located in said pocket means.

9. A folder according to claim 8 wherein said first and second fastening elements are comprised of mating velcro pads.

10. A folder according to claim 8 further comprising a flat, rectangular grease pencil board having a flat writing surface permanently marked with a diagram of the playing area and demarkation lines of an athletic sport and adapted to receive erasable markings from a grease pencil thereon and an opposite mounting surface having second releaseable fastening elements thereon arranged in said second, mirror image pattern, whereby said grease pencil board i also releasably securable to both said interior and exterior surfaces of at least said one of said covers, and further comprising grease pencil markers located in said pocket means.

11. A folder according to claim 8 further comprising an insert releasably securable between said covers at said hinge and including a pair of flat, rectangular panels connected along opposite edges that are perpendicular to said hinge by accordian webs to define a pocket between said panels having a mouth opening outwardly opposite from said hinge.

12. A folder according to claim 11 wherein said insert includes a mounting strip secured to said panels and having apertures therethrough adjacent to said hinge, and further comprising an inwardly directed channel secured to said hinge between said covers and having apertures therethrough longitudinally aligned with said apertures in said mounting strip, and releasable, transverse fasteners adapted to extend through said apertures in said mounting strip and said channel to releasably secure said insert between said covers.

* * * * *